(12) United States Patent
Jung

(10) Patent No.: US 11,074,596 B1
(45) Date of Patent: Jul. 27, 2021

(54) SYSTEM AND METHOD FOR IDENTIFYING TOPIC COVERAGE FOR A DISTRIBUTION PLATFORM THAT PROVIDES ACCESS TO ONLINE CONTENT ITEMS

(71) Applicant: Udemy, Inc., San Francisco, CA (US)

(72) Inventor: Seijin Jung, San Francisco, CA (US)

(73) Assignee: Udemy, Inc., San Francisco, CA (US)

( * ) Notice: Subject to any disclaimer, the term of this patent is extended or adjusted under 35 U.S.C. 154(b) by 369 days.

(21) Appl. No.: 15/488,231

(22) Filed: Apr. 14, 2017

(51) Int. Cl.
  *G06Q 30/02* (2012.01)
  *G06F 16/435* (2019.01)
  *G06F 16/33* (2019.01)

(52) U.S. Cl.
  CPC ..... *G06Q 30/0202* (2013.01); *G06F 16/3334* (2019.01); *G06F 16/435* (2019.01)

(58) Field of Classification Search
  None
  See application file for complete search history.

(56) References Cited

U.S. PATENT DOCUMENTS

| 9,110,977 | B1 * | 8/2015 | Pierre | G06F 16/3334 |
| 9,430,572 | B2 | 8/2016 | Liu | |
| 2002/0169657 | A1 * | 11/2002 | Singh | G06Q 10/06 |
| | | | | 705/7.31 |
| 2013/0198204 | A1 | 8/2013 | Williams | |
| 2013/0297590 | A1 * | 11/2013 | Zukovsky | G06F 16/248 |
| | | | | 707/722 |
| 2014/0280890 | A1 | 9/2014 | Yi | |
| 2015/0074131 | A1 * | 3/2015 | Fernandez | G06F 16/435 |
| | | | | 707/758 |
| 2015/0172396 | A1 * | 6/2015 | Longo | H04L 51/20 |
| | | | | 709/204 |
| 2016/0203523 | A1 * | 7/2016 | Spasojevic | G06Q 30/0269 |
| | | | | 705/14.66 |

OTHER PUBLICATIONS

Shook et al., Happy or not: Generating topic-based emotional heatmaps for Culturomics using CyberGIS, 2012 IEEE 8th International Conference on E-Science, Date of Conference: Oct. 8-12, 2012 (Year: 2012).*

* cited by examiner

*Primary Examiner* — Patricia H Munson
*Assistant Examiner* — Chesiree A Walton
(74) *Attorney, Agent, or Firm* — McDermott Will & Emery LLP

(57) ABSTRACT

Systems and methods for identifying topic coverage for a distribution platform that provides access to online content items. A set of topics that characterize subject matter of the online content items available via a system distribution platform may be obtained and individual ones of the content items may be associated with individual ones of the topics. Internal demand and/or external demand associated with the individual ones of the topics may be determined. Disparities between the internal demand and/or the external demand may be determined for individual ones of the content items. A graphical representation of the disparities determined may be generated.

24 Claims, 4 Drawing Sheets

SYSTEM AND METHOD FOR IDENTIFYING TOPIC COVERAGE FOR A DISTRIBUTION PLATFORM THAT PROVIDES ACCESS TO ONLINE CONTENT ITEMS

FIELD OF THE INVENTION

The disclosure relates to systems and methods for identifying topic coverage for a distribution platform that provides access to online content items.

BACKGROUND OF THE INVENTION

Online content distribution platforms may offer large quantities and/or various types of online content items for sale to users. The content items may have widely varying subject matter. Some online content distribution platforms enable creators to upload and/or sell content items associated with any appropriate topic and/or subject matter they desire. As such, several content items may have similar subject matters. And, few or no content items may be available for some subject matters and/or topics. Due to the vast quantities of online content items available via typical content distribution platforms, platform providers generally do not actively manage which topics and/or subject matters are over and/or underrepresented.

SUMMARY

The system may obtain a set of topics that characterize subject matter of online content items available via a system distribution platform. Individual ones of the online content items may be associated with one or more individual ones of the topics. The system may determine internal demand and/or external demand associated with the individual topics. The system may determine disparities between the internal demand and/or the external demand. The disparities may be used to identify gaps, underperforming areas, mature areas, under monetized areas, successful areas, and/or areas of opportunity in the topics covered by the online content items available via the system distribution platform. Such information may enable platform providers to better acquire online content items, allocate marketing and/or promotional resources, identify opportunity, strengths and/or weaknesses, and/or to otherwise improve the topic coverage of online content distribution platforms compared to typically existing systems and methods.

A system configured to identify topic coverage for a distribution platform that provides access to online content items may include one or more server(s) and/or one or more client computing platforms. The server(s) and the client computing platform(s) may communicate in a client/server configuration and/or other configuration. The server(s) may include one or more processors configured by machine-readable instructions to execute computer program components. The computer program components may include one or more of: a content item component, topic component, internal demand component, external demand component, disparity component, graphical component, and/or other components.

The content item component may be configured to manage one or more online content items available via a system distribution platform. The content items may include one or more of a video, an audio file, a text file, a PDF, an image, a slideshow presentation, an interactive worksheet, and/or other online and/or digital content items.

The topic component may be configured to obtain a set of topics that characterize subject matter of the online content items available via the system distribution platform. The set of topics may include a first topic. In some implantations, individual topics within the set of topics may be associated with one or more semantic tags. The topic component may be configured to associate individual ones of the content items with one or more individual ones of the topics. In some implementations, individual ones of the content items may be associated with individual ones of the topics may be based on the semantic tags. The topic component may be configured to determine quantities of the online content items available via the system distribution platform associated with the individual ones of the topics.

The internal demand component may be configured to determine internal demand associated with individual ones of the topics. The internal demand associated with an individual topic may indicate demand for content related to the individual topic within the system distribution platform. The internal demand may be determined based on internal search information, internal revenue information, and/or other information. The internal search information may include information related internal search queries for content items may be available via distribution platform and/or internal search queries entered via the system distribution platform. The internal search information associated with one or more topics may indicate quantities of, results for, and/or interactions with results for internal search queries that include one or more keywords corresponding to one or more of the topics. The internal revenue information may indicate revenue generated from one or more of the online content items associated with individual ones of the topics.

The external demand component may be configured to determine external demand associated with the individual ones of the topics. The external demand associated with an individual topic may indicate demand for content associated with the individual topic outside the system distribution platform. The external demand may be determined based on search information from one or more search platforms external to the system distribution platform, social interest information from one or more external platforms, and/or other information. The external search information may include a quantity of, results for, and/or interactions with results for external search queries entered via the one or more search platforms to the system distribution platform. The external search information may indicate quantities of and/or interactions with the results for external search queries including one or more keywords corresponding to the one or more topics and/or including one or more semantic tags associated with the one or more topics, and/or one or more learning intention keywords. The social interest information may indicate user interest in and/or engagement with the one or more topics via the one or more external platforms. In some implementations, the one or more external platforms may include one or more of a search engine, a social media platform, a content distribution platform different from the system distribution platform, and/or another external platform.

The disparity component may be configured to determine disparities between the internal demand, the external demand, portions of the internal demand, portions of the external demand for the individual ones of the topics, and/or other information. In some implementations, the disparities may include a ratio between one or more portions of internal demand and/or one or more portions of external demand, and/or a ratio between one or more portions of external demand and/or one or more portions of internal demand. The disparities including the ratio may be represented by the ratio and/or the quotient that names the ratio. In some implementations, the ratio may include one or both of a ratio and/or quotient representing the ratio of the first internal revenue for a given period of time to a quantity of searches and/or users searching keywords corresponding to the first topic via the one or more external platforms, a ratio and/or quotient representing the ratio of the first internal revenue for a given period of time to a quantity of internal searches and/or internal users searching keywords corresponding to the first topic via the system distribution platform, and/or other ratios.

The graphical component may be configured to generate a graphical representation of disparities determined. The graphical representation may include a heat map. Topics having disparities at or above one or more thresholds may be displayed differently than topics having disparities below the one or more thresholds within the heat map.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
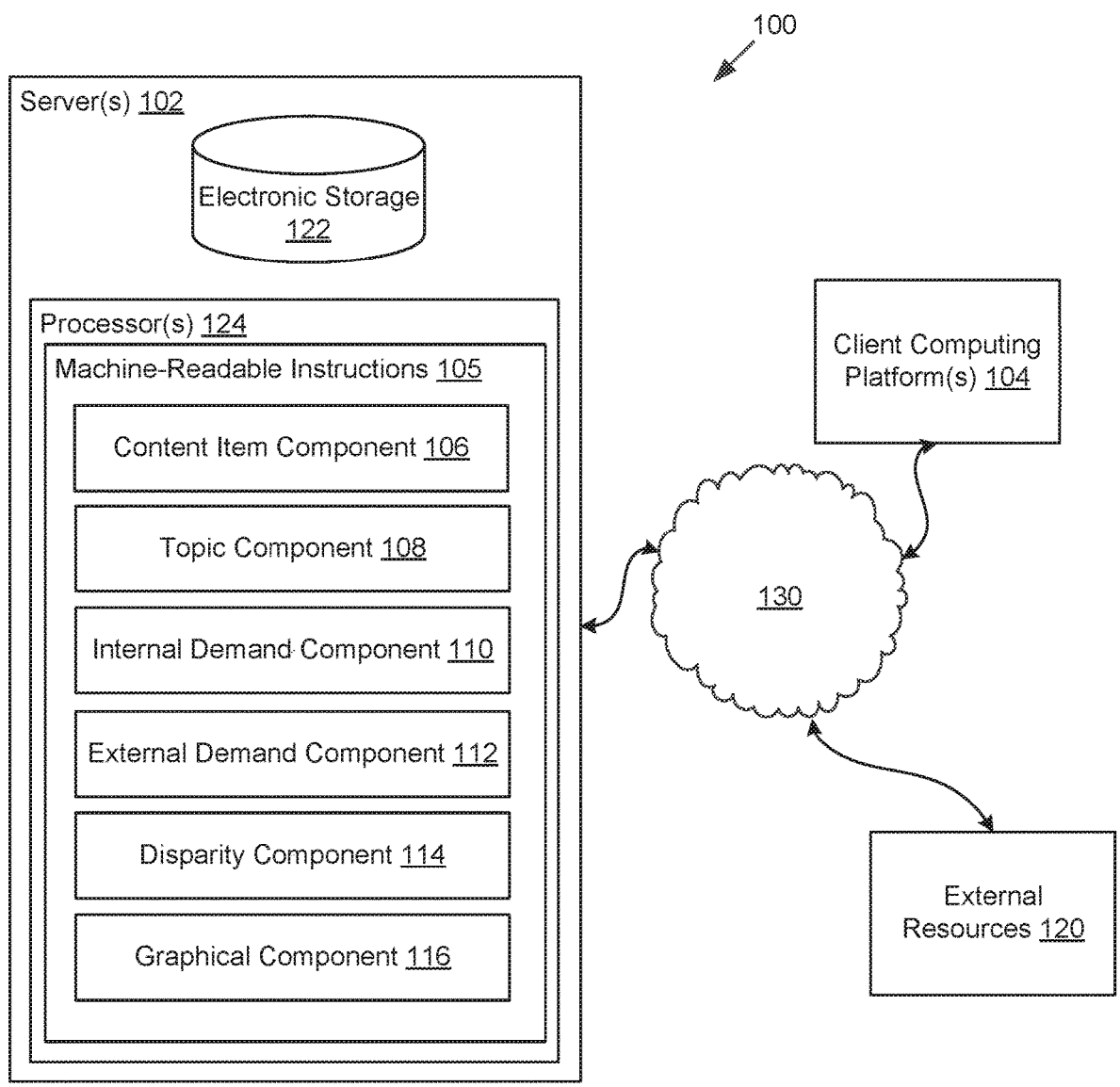
FIG. 1 illustrates a system for identifying topic coverage for a distribution platform that provide access to online content items, in accordance with one or more implementations.

FIG. 1 illustrates an example system 100 that is configured for identifying topic coverage for a distribution platform that provide access to online content items. The system 100 may be configured to obtain a set of topics the characters subject matter of the online content items available via a system distribution platform. System 100 may associate individual ones of the online content items with individual ones of the topics. Internal demand and/or external demand associated with individual topics may be determined by system 100. Disparities between the internal demand and/or the external demand may be determined for the individual topics. System 100 may generate a graphical representation of the disparities determined to enable platform providers to identify topics having higher disparities than other topics. Topics associated with high disparities between internal and/or external demand may indicate the individual topics are underrepresented, underperforming, under monetized, and/or otherwise problematic. Such disparities may be used to identify opportunities, areas of improvement, and/or growth potential for online content distribution platforms.

In some implementations, the system distribution platform may include an online educational platform through which online educational courses are available and/or sold to users. The online content items may include online educational courses. The online educational courses may comprise one or more pieces of online content items such as one or more videos, audio, documents, PDFs, images, slideshow presentations, interactive worksheets and/or user input interfaces, and/or other pieces of online content items. System 100 may enable the system distribution platform (e.g., the online education platform) providers to identify gaps, potential improvements, and/or opportunities based on their topic coverage.

As illustrated in FIG. 1, system 100 may include one or more server(s) 102, one or more client computing platform(s) 104, electronic storage 122, one or more external resources 120, one or more physical processor(s) 124 configured to execute machine-readable instructions 105, one or more computer program components 106-116, and/or other components.

One or more physical processor(s) 124 may be configured to execute machine-readable instructions. Executing machine-readable instructions 105 may cause the one or more physical processor(s) 124 to predict revenue to be generated by online content items. Machine-readable instructions 105 may include one or more computer program components such as a content item component 106, topic component 108, internal demand component 110, external demand component 112, disparity component 114, graphical component 116, and/or other components.

In some implementations, server(s) 102 may be configured to provide remote hosting of the features and/or functions of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a laptop, a tablet computer, a desktop computer, a cellular telephone, a smartphone, a digital camera, a television set-top box, smart TV, a gaming console, and/or other platforms. Users may enter keywords in internal and/or external search queries, engage with content via one or more platforms, consume the online content items, and/or otherwise interact with the system distribution platform, online content items, and/or external platforms via the client computing platform(s) 104.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Content item component 106 may be configured to manage one or more online content items available via a system distribution platform. Managing the online content items may include making the content items available to users and/or searchable by users via a system distribution platform. The system distribution platform may be accessible via client computing platforms 104. Content item component 106 may facilitate presentation of a query interface such that the user may submit queries for content items available via the system distribution platform. The online content items may include one or more online digital content items. The content items may include one or more of a video, an audio file, a text file, a PDF, an image, a slideshow presentation, an interactive worksheet, and/or other online and/or digital content items. By way of non-limiting example, the online content items may include online education courses. Continuing the non-limiting example, the system distribution platform may include an online education platform through which users may search online course availability, purchase courses, view/interact with the courses, and/or complete the courses.

Topic component 108 may be configured to obtain a set of topics that characterize subject matter of the online content items available via the system distribution platform. The set of topics may include a predefined set of topics, and/or a set of topics that continuously changes and/or grows (e.g., based on machine-learning). The set of topics may include a first topic.

In some implantations, individual topics within the set of topics may be associated with one or more semantic tags. The semantic tags associated with a given topic may include terms and/or tags users are likely to search when looking for content items related to the given topic. Topic component 108 may be configured to associate the one or more semantic tags with the online content items available via the system distribution platform. In some implementations, a first topic within the set of topics may be associated with first semantic tags. The first semantic tags may be associated with first content items.

Topic component 108 may be configured to associate individual ones of the content items with one or more individual ones of the topics based on the semantic tags. The semantic tags may include metadata assigned to individual ones of the content items. The metadata may include keywords the users are likely to search when looking for the content items. As such, the individual ones of the content items may be associated with the individual topics within the set of topics based on the sematic tags associated with the content items and/or the semantic tags associated with the topics. By way of non-limiting example, where one or more of the semantic tags associated with a given topic correspond to one or more of the semantic tags associated with a given content item, the given content item may be associated with the given topic. In some implementations, the first content items may be associated with the first topic.

The first content items may be associated with the first topic based on the first semantic tags. A given topic may have one or multiple content items associated with it. A quantity of content items available via the system distribution platform associated with a given topic may indicate the system distribution platform's coverage of the given topic. By way of example, the system distribution platform's coverage of a given topic may indicate how many educational courses related to a given topic the system distribution platform offers.

In some implementations, topic component 108 may be configured to determine quantities of the online content items available via the system distribution platform associated with the individual ones of the topics. Individual quantities of online content items available via the system distribution platform for individual ones of the topics within the set of topics may be determined, stored, updated, and/or otherwise managed by topic component 108. In some implementations, a first quantity of online content items available via the system distribution platform associated with the first topic may be determined.

Internal demand component 110 may be configured to determine internal demand associated with individual ones of the topics. The internal demand associated with an individual topic may indicate demand for content related to the individual topic within the system distribution platform. By way of non-limiting example, the internal demand associated with the one or more subjects may include the system distribution platform's measure of demand for individual ones of the topics and/or may represent how interested users are (e.g., a level of user interest, an amount of users interested, a frequency of user interest, etc.) in obtaining and/or purchasing content items related to the individual subjects through the system distribution platform. The internal demand associated with the individual topics may be determined based on internal search information, internal revenue information, and/or other information. The internal demand may include one or more metrics quantifying and/or characterizing the internal search information, the internal revenue information, and/or other information. By way of example, the internal demand may include one or more metrics quantifying and/or characterizing one or more portions of the internal search information, the internal revenue information, and/or other information.

The internal search information may include information related to internal search queries for content items that may be available via the system distribution platform and/or internal search queries entered via the system distribution platform. The internal search information may indicate a quantity of, results for, and/or interactions with results for internal search queries entered via the system distribution platform. The internal search information associated with one or more topics may indicate quantities of, results for, and/or interactions with results for internal search queries that include one or more keywords corresponding to one or more of the topics. In some implementations, the keywords may correspond to one or more of the topics responsive to the keywords including the semantic tags associated with one or more of the topics. A quantity of the internal search queries entered via the system distribution platform may include a quantity of users searching for one or more keywords, a quantity of internal search queries, a quantity of unique and/or new users, a quantity of searches submitted by unique and/or new users, and/or other quantities indicating the quantity of internal search queries.

Results for the internal search queries may include an amount of content items included in the results for one or more keywords corresponding to the one or more topics and/or including the semantic tags associated with the one or more topics (e.g., indicating the amount of content items available via the system distribution platform related to the one or more topics), and/or other results for the internal search queries. The interactions with results for the internal search queries may include feedback interactions (e.g., ratings, reviews, etc.) indicating the quality level of content items included in results for the search queries; information indicating how often and/or likely users searching for one or more keywords corresponding to the one or more topics and/or including the semantic tags associated with the one or more topics, purchased, completed, and/or otherwise interacted with the content items included as the results for the internal search queries; and/or other interactions with the results of the internal. By way of non-limiting example, the internal search information may include an amount (e.g., a quantity, percentage, ratio, etc.) of users that purchased content items corresponding to a given topic from those that entered internal search queries for one or more keywords corresponding to the given subject and/or including the semantic tags associated with the one or more topics. By way of another non-limiting example, the internal search information may include an average rating and/or review associated with the content items included in the results for internal search queries for one or more keywords corresponding to the given subject and/or including the semantic tags associated with the one or more topics.

In some implementations, first internal demand for the first topic may be determined based on first internal search information, first internal revenue information, and/or other information. The first search information may indicate the quantity of, results for, and/or interactions with the results for the internal search queries entered via the system distribution platform that include keywords corresponding the first topic and/or one or more of the first semantic tags. The first internal revenue information may indicate revenue generated from one or more of the first content items associated with the first topic.

Internal demand component 110 may be configured to determine internal revenue information. The internal revenue information may indicate revenue generated from one or more of the online content items associated with individual ones of the topics. The internal revenue information for a given subject may include the revenue generated from the sale of content items associated with individual ones of the topics. In some implementations, the internal revenue for a given topic may include revenue generated from content items related to the given topic for a period of time (e.g., the past 90 days, the past 6 weeks, etc.). In some implementations, the first internal demand may be determined based on first internal revenue information. The first revenue information may indicate the revenue generated from the one or more online content items related to the first topic. By way of non-limiting example, the internal revenue information for individual ones of the topics may be tracked by tracking sales of, sales prices for, and/or revenue generated from online content items associated with the individual ones of the topics.

External demand component 112 may be configured to determine external demand associated with the individual ones of the topics. The external demand associated with an individual topic may indicate demand for content associated with the individual topic outside the system distribution platform. The external demand may be determined based on search information from one or more search platforms external to the system distribution platform, social interest information from one or more external platforms, and/or other information. The external demand may include one or more metrics quantifying and/or characterizing the external search information, the social interest information from one or more external platforms, and/or other information. By way of example, the external demand may include one or more metrics quantifying and/or characterizing one or more portions of the external search information, the social interest information from one or more external platforms, and/or other information.

In some implementations, a first external demand associated with the first topic may be determined based on first search information from the one or more search platforms external to the system distribution platform, first social interest information from the one or more external platforms, and/or other information.

The external search information may include search information from one or more search platforms external to the online distribution platform. The external search information may include a quantity of, results for, and/or interactions with results for external search queries entered via the one or more search platforms to the system distribution platform. The external search information may include information relating to search queries including one or more keywords corresponding to the one or more topics and/or including one or more semantic tags associated with the one or more topics, one or more learning intention keywords, and/or other keywords.

By way of non-limiting example, the external search information may include search information for search queries entered via one or more external search platforms and/or including one or more keywords corresponding to the one or more topics and/or including one or more semantic tags associated with the one or more topics, paired with at least one learning intention keyword. As such, the external search information may indicate general users' desire to learn about a given topic across the Internet as a whole, and/or across a given search platform external to the online distribution platform. The learning intention keyword(s) may indicate a user's desire to learn. Pairing a learning intention keyword with another keyword may indicate the user's desire to learn about a topic corresponding to the other keyword.

The external search information may be associated with one or more of the topics. The external search information may indicate quantities of and/or interactions with the results for external search queries including one or more keywords corresponding to the one or more topics and/or including one or more semantic tags associated with the one or more topics, and/or one or more learning intention keywords. A quantity of external search queries entered via an external search platform may include a quantity of users searching for one or more keywords corresponding to the one or more topics (and/or including one or more semantic tags associated with the one or more topics) with (or without) one or more learning intention keywords, a quantity of external search queries including keywords corresponding to the one or more topics (and/or including one or more semantic tags associated with the one or more topics) with (or without) one or more learning intention keywords, a quantity of unique and/or new users searching for one or more keywords corresponding to the one or more topics (and/or including one or more semantic tags associated with the one or more topics) with (or without) one or more learning intention keywords via one of the external platforms, a quantity of searches submitted by unique and/or new users searching for one or more keywords corresponding to the one or more topics (and/or including one or more semantic tags associated with the one or more topics) with (or without) one or more learning intention keywords via one of the external platforms, and/or other quantities indicating the quantity of external search queries.

The interactions with the results for the external search queries may include information indicating how the users interacted with the results for the external search queries. By way of non-limiting example, the external search information may include whether a user clicked on, hovered over, viewed, and/or otherwise interacted with the results for the external search queries.

External demand component 112 may be configured to determine social interest information associated with one or more of the topics. The social interest information may indicate user interest in and/or engagement with the one or more topics via the one or more external platforms. In some implementations, the one or more external platforms may include one or more of a search engine, a social media platform, a content distribution platform different from the system distribution platform, and/or another external platform. The social interest information may include one or more of: a quantity of comments related to the one or more topics, a quantity of reactions to content (e.g., likes, emoticon reactions, upvotes, hearts, etc.) related to the one or more topics, followers and/or fans of content related to the one or more topics, members of groups and/or pages associated with the one or more topics, and/or other social interest information.

In some implementations, first external demand associated with the first topic may be determined. The first external demand may be determined based on first search information from the one or more search platforms external to the system distribution platform, first social interest information associated with the first topic from the one or more external platforms, and/or other information.

Disparity component 114 may be configured to determine disparities between the internal demand, the external demand, portions of the internal demand, portions of the external demand for the individual ones of the topics, and/or other information. Disparities may indicate and/or represent a difference between external demand and/or internal demand. In some implementations, for example, the disparities may be used to identify one or more of an underrepresented, under monetized, and/or underperforming topics. In some implementations, disparities may include a ratio between one or more portions of internal demand and/or one or more portions of external demand, and/or a ratio between one or more portions of external demand and/or one or more portions of internal demand. In some implementations, a first disparity may be determined between one or more of the first internal demand, the first external demand, one or more portions of the first internal demand, and/or one or more portions of the first external demand. The disparities including the ratio may be represented by the ratio and/or the quotient that names the ratio.

By way of non-limiting example, a disparity between the internal revenue associated with a given topic and the internal and/or external search information (e.g., the internal revenue being low and/or small in comparison to a high quantity of searches) may indicate users are searching for content items related to the given topic but not purchasing content items, such that the number of content items available may be too low (e.g., the topic may be underrepresented). By way of another non-limiting example, a disparity between the internal revenue associated with a given topic and the external search information (e.g., the internal revenue being low and/or small in comparison to a high quantity of external searches) may indicate users are interested in learning about the given topic but the system platform does not capitalize on the demand opportunity, such that the number of content items available may be too low (e.g., the topic may be under monetized). By way of still another non-limiting example, a disparity between the internal revenue associated with a given topic and the internal search information (e.g., the internal revenue being low and/or small in comparison to a high quantity of internal searches) may indicate users are searching the system distribution platform for content items related to the given topic, but not purchasing content items, may indicate the quality and/or type of online content items available via the system distribution platform are insufficient and/or not what users want (e.g., the topic may be under performing and/or under monetized).

In some implementations, the disparities may include a ratio and/or quotient representing the ratio of one or more of: the internal demand to the external demand, the external demand to the internal demand, a portion of the internal demand to a portion of the external demand, a portion of the external demand to a portion of the internal demand, a portion of the internal demand to another portion of the internal demand, a portion of the external demand to another portion of the external demand, and/or other ratios and/or quotients. For example, the ratio may include a ratio of the first internal revenue for a given period of time to a quantity of searches and/or users searching keywords that correspond to the first topic and/or include the first semantic tags via the one or more external platforms. By way of another example, the ratio may include a ratio of the first internal revenue for a given period of time to a quantity of internal searches and/or internal users searching keywords that correspond to the first topic and/or include the first semantic tags via the system distribution platform.

In some implementations, disparity component 114 may be configured to determine coverage disparities between (i) the quantities of content items available via the system distribution platform, and (ii) the internal demand and/or external demand for the individual ones of the topics. Coverage disparities may indicate whether the system distribution platform offers enough content items associated with a given topic based on the internal and/or external demand for that topic. By way of non-limiting example, if 50,000 users are searching "learn to play the piano" via one or more external search platforms and/or "piano lessons" via an internal search query, but the system distribution platform only offers 6 content items associated with the topic "piano," a large coverage disparity may be determined. In some implementations, the coverage disparities may be determined on a comparative basis such that whether or not the system distribution platform offers enough content items associated with a given topic is determined based on the quantities of content items available via the system distribution platform associated with other topics compared to the internal demand and/or the external demand for the other topics. In some implementations, a first coverage disparity is determined between the first quantity of content times and first internal demand and/or the first external demand. In some implementations, a graphical representation may be generated for a single disparity determined for an individual topic.

Graphical component 116 may be configured to generate a graphical representation of the disparities determined. The graphical representation of the disparities may include a representation of the ratios and/or quotients naming the ratios. In some implementations, the graphical representation may include a heat map wherein topics having disparities at or above one or more thresholds are displayed differently than the topics having disparities below the one or more thresholds. For example, the graphical representation may be generated based on conditional formatting. By way of non-limiting example, for topics having the biggest/largest disparities (e.g., the lower quotients) between portions of internal demand and/or external demand, the graphical representation may depict the topics via various shades of red (and/or any other color). For topics that have smaller amounts of disparity between portions of internal demand and/or external demand, the graphical representation may depict the topics via various shades of green (and/or any other color). Topics having smaller amounts of disparity may indicate subject matter areas where the system distribution platform has the most maturity (e.g., satisfies the internal and/or external demand with regard to those topics). Topics having larger amounts of disparity may indicate subject matter areas where the system distribution platform is less mature (e.g., does not satisfy the internal and/or external demand with regard to those topics).

Figure 2:
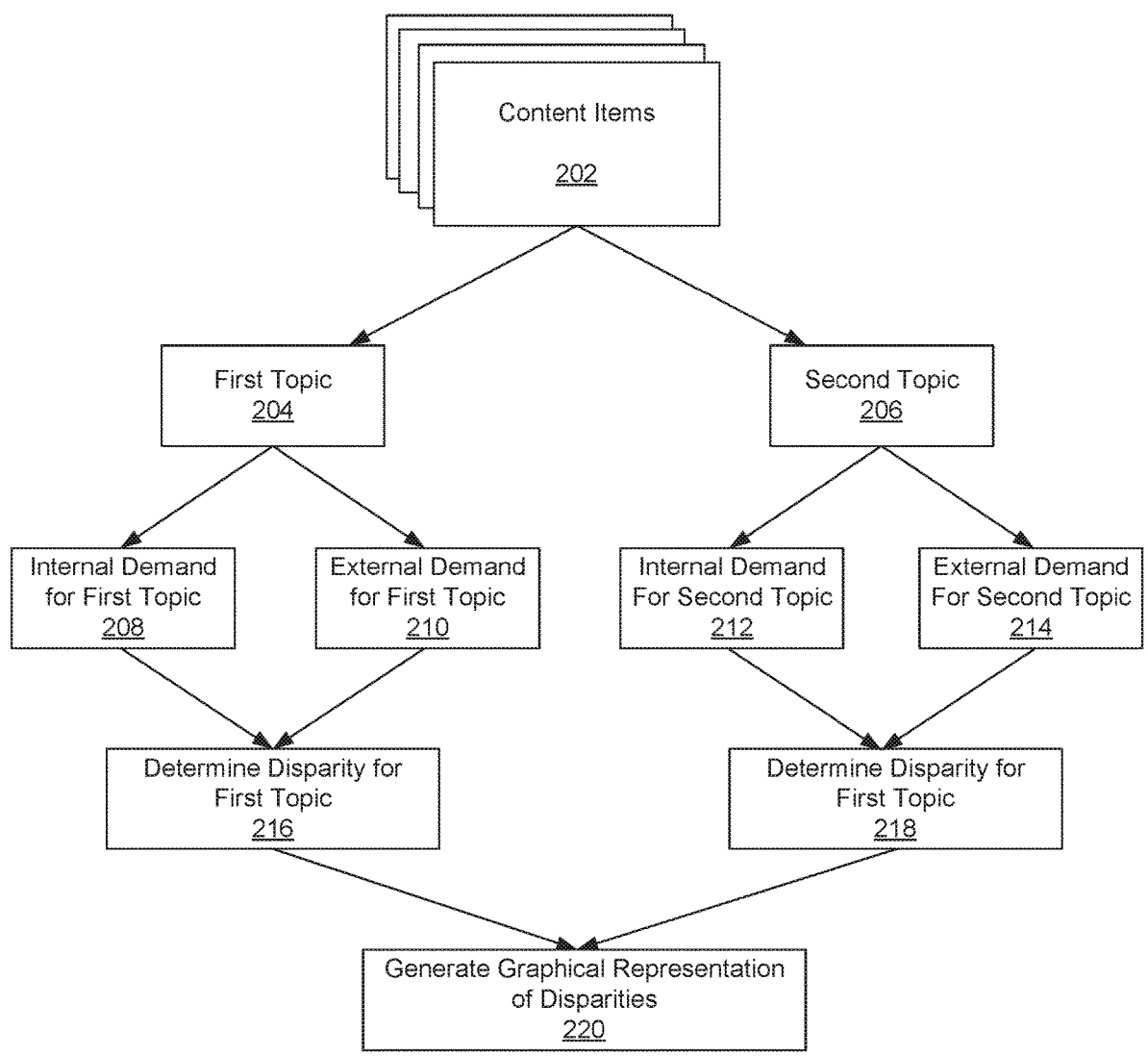
FIG. 2 illustrates a process for identifying topic coverage for a distribution platform that provides access to online content items, in accordance with one or more implementations.

FIG. 2 illustrates a process for identifying topic coverage for a distribution platform that provides access to online content items, in accordance with one or more implementations. At step 201, multiple online content items 202 available via the system distribution platform may be associated with first topic 204 and/or second topic 206. At step 203, internal demand 208 for the first topic 204 and/or external demand 210 for the first topic 204 may be determined. At step 205, internal demand 212 for the second topic 206 and/or external demand 214 for the second topic 206 may be determined. At step 207, disparity 216 between internal demand 208 and/or external demand 210 for the first topic 204 may be determined. At step 209, disparity 218 between internal demand 212 and/or external demand 214 for the second topic 206 may be determined. At step 211, a graphical representation 220 of the disparities 216 and 218 may be generated.

Figure 3:
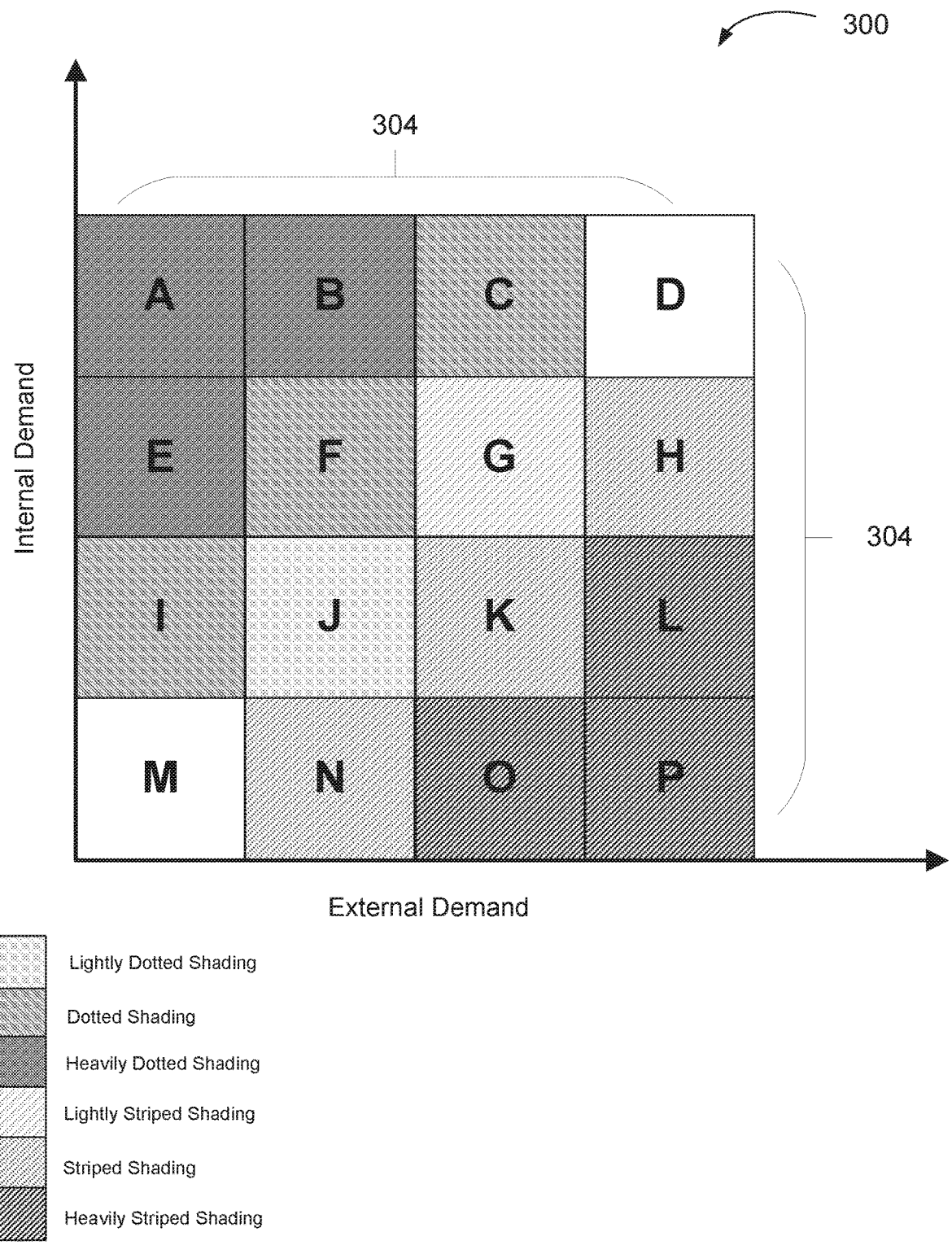
FIG. 3 illustrates a graphical representation of the disparities for multiple individual topics, in accordance with one or more implementations.

FIG. 3, illustrates a graphical representation 300 of the disparities for multiple individual topics 304, in accordance with one or more implementations. Graphical representation 300 may represent disparities for individual topics 304 that characterize the subject matter of online content items available via a system distribution platform (e.g., the same and/or similar to the system distribution platform provided by system 100).

Topics A, B, and E 304 may have the smallest amount of disparity between internal demand and/or external demand associated with topics A, B, and E 304. As such, topics A, B, and E 304 may be depicted in graphical representation 300 as dark green (e.g., heavily dotted shading). Topics I, F, and C 304 may have the $2^{nd}$ smallest amount of disparity between internal demand and/or external demand associated with topics I, F, and C 304. As such, topics I, F, and C 304 may be depicted in graphical representation 300 as green (e.g., dotted shading). Topic J 304 may have the $3^{rd}$ smallest amount of disparity between internal demand and/or external demand associated with topic J 304. As such, topic J 304 may be depicted in graphical representation 300 as light green (e.g., lightly dotted shading).

Topics O, P, and L 304 may have the largest amount of disparity between internal demand and/or external demand associated with topics O, P, and L 304. As such, topics O, P, and L 304 may be depicted in graphical representation 300 as dark red (e.g., heavily striped shading). Topics H, K, and N 304 may have the $2^{nd}$ largest amount of disparity between internal demand and/or external demand associated with topics H, K, and N 304. As such, topics H, K, and N 304 may be depicted in graphical representation 300 as red (e.g., striped shading). Topic G 304 may have the $3^{rd}$ largest amount of disparity between internal demand and/or external demand associated with topic G 304. As such, topic G 304 may be depicted in graphical representation 300 as light red (e.g., lightly striped shading).

The green topics 304 (e.g., the dotted shaded topics 304) may indicate mature, well-represented, monetized, and/or high performing topics for the system distribution platform. The darker and/or heavier the shading, the more mature, well-represented, monetized, and/or high performing the topics may be. The red topics 304 (e.g., the heavily dotted shaded topics 304) may indicate mature, well-represented, monetized, and/or high performing topics for the system distribution platform. The darker and/or heavier the shading, the more mature, well-represented, monetized, and/or high performing the topics may be. The red topics 304 (e.g., the striped shaded topics 304) may indicate less mature, underrepresented, underperforming, under monetized, and/or high opportunity/room for improvement topics for the system distribution platform. The darker and/or heavier the shading, more underrepresented, underperforming, and/or under monetized the topic may be. As such, the higher the opportunity/room for improvement may be. Graphical representation 300 may be used to identify topics associated with high disparities between internal demand and/or external demand for identifying opportunities and/or improvements for the content items available via the system distribution platform.

Returning to FIG. 1, In some implementations, topic component 108 may be configured to filter and/or group one or more of the topics into categories. As such, graphical component 116 may be configured to generate a graphical representation indicating the topic coverage of the system distribution platform by categories (e.g., as a macro grouping overall, in additional to micro groups for specific categories).

The server(s) 102, client computing platforms 104, and/or external resources 120 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 120 may be operatively linked via some other communication media.

The external resources 120 may include one or more external search platforms, external platforms (e.g., a search engine, a social media platform, a content distribution platform different from the system distribution platform), sources of information, hosts and/or providers of products outside of system 100, external entities participating with system 100, external entities for products and/or product platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 124 may be configured to execute components 106-116. Processor 124 may be configured to execute components 106, 108, 110, 112, 114, 116, and/or 118, by software; hardware; firmware; some combination of software, hardware, and/or firmware; and/or other mechanisms for configuring processing capabilities on processor 124. Processor 124 may include a combination of processors, APIs, third party services, networks, and/or machine-readable instructions.

It should be appreciated that although components 106-116 are illustrated in FIG. 1 as being located and/or co-located within a particular component of system 100, in implementations in which physical processor(s) 124 include multiple processing units, one or more of components 106-116 may be located remotely from the other components.

While computer program components are described herein as being implemented via processor 124 through machine-readable instructions 105, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different components 106-116 described herein is for illustrative purposes, and is not intended to be limiting, as any of components 106-116 may provide more or less functionality than is described. For example, one or more of components 106-116 may be eliminated, and some or all of its functionality may be incorporated, shared, integrated into, and/or otherwise provided by other ones of components 106-116. Note that physical processor(s) 124 may be configured to execute one or more additional components that may perform some or all of the functionality attributed herein to one of components 106-116.

One or more of the components of system 100 may be configured to present and/or provide an administrator interface between system 100 and a user through which the administrator can provide information to and receive information from system 100. This enables data, results, and/or instructions (e.g., determinations, selections, and/or other indications) and any other communicable items, collectively referred to as "information," to be communicated between the administrator and system 100. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 4:
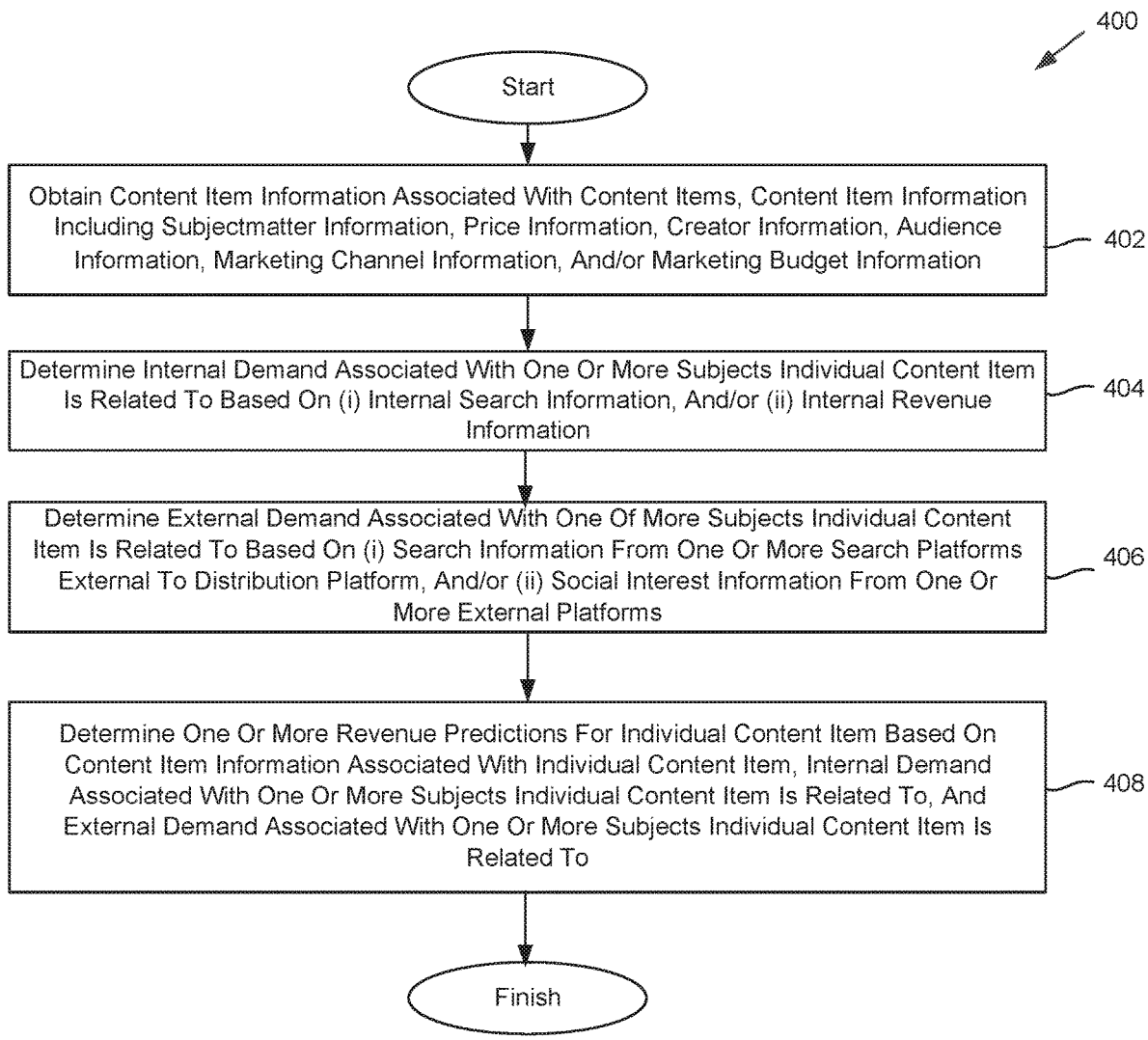
FIG. 4 illustrates a method for identifying topic coverage for a distribution platform that provides access to online content items, in accordance with one or more implementations.

FIG. 4 illustrates an exemplary method 400 identifying topic coverage for a distribution platform that provides access to online content items, in accordance with one or more implementations. The operations of method 400 presented below are intended to be illustrative and non-limiting examples. In certain implementations, method 400 may be accomplished with one or more additional operations not described, and/or without one or more of the operations discussed. Additionally, the order in which the operations of method 400 are illustrated in FIG. 4 and described below is not intended to be limiting.

In certain implementations, method 400 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Regarding method 400, at an operation 402, a set of topics may be obtained. The set of topics may characterize subject matter of the online content items available via a system distribution platform. The set of topics may include individual topics. The individual topics may include a first topic. In some implementations, operation 402 is performed by a content item component the same as or similar to content item component 106 (shown in FIG. 1 and described herein).

At an operation 404, individual ones of the online content items may be associated with one or more individual ones of the topics. The first content items may be associated with the first topic. In some implementations, operation 404 is performed by a topic component the same as or similar to topic component 108 (shown in FIG. 1 and described herein).

At an operation 406, internal demand associated with the individual ones of the topics may be determined. The internal demand associated with an individual topic may indicate demand for content related to the individual topic within the system distribution platform. The internal demand associated with the individual topics may be determined based on (i) internal search information, (ii) internal revenue information, and/or other information. The first internal demand associated with the first topic may be determined based on first internal search information, first internal revenue information, and/or other information. In some implementations, operation 406 is performed by an internal demand component the same as or similar to internal demand component 110 (shown in FIG. 1 and described herein).

At an operation 408, external demand associated with the individual ones of the topics may be determined. The external demand associated with the individual topic may indicate demand for content related to the individual topic outside of the system distribution platform. The external demand associated with the individual topics may be determined based on (i) search information from one or more search platforms external to the system distribution platform, (ii) social interest information associated with individual ones of the topics from one or more external platforms, and/or other information. First external demand associated with the first topic may be determined based on (i) first search information from the one or more search platforms external to the system distribution platform, (ii) first social interest information associated with the first topic from the one or more external platforms, and/or other information. In some implementations, operation 408 is performed by an external demand component the same as or similar to external demand component 112 (shown in FIG. 1 and described herein).

At an operation 410, disparities between the internal demand, the external demand, one or more portions of the internal demand, and/or one or more portions of the external demand for the individual ones of the topics may be determined. A first disparity between one or more of the first internal demand, the first external demand, one or more portions of the first internal demand, and/or one or more portions of the first external demand may be determined. In some implementations, operation 410 is performed by an disparity component the same as or similar to disparity component 114 (shown in FIG. 1 and described herein).

At an operation 412, a graphical representation of the disparities determined may be generated. In some implementations, operation 412 is performed by a graphical component the same as or similar to graphical component 116 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for identifying topic coverage for a distribution platform that provides access to multiple online content items, the system comprising:
one or more processors configured by machine-readable instructions to:
obtain a set of topics that characterize subject matter of the online content items available via a system distribution platform, the set of topics including individual topics, the individual topics including a first topic;
associate each of the online content items with one or more individual topics, wherein first online content items of the online content items are associated with the first topic;
determine an internal demand associated with the one or more individual topics, the internal demand associated with the one or more individual topics indicating an internal demand for the online content items related to the one or more individual topics within the system distribution platform, the internal demand associated with the one or more individual topics being determined based on one of (i) an internal search information received by the one or more processors and (ii) an internal revenue information, wherein a first internal demand of the internal demand associated with the first topic is determined based on one of a first internal search information of the internal search information and a first internal revenue information of the internal revenue information;
determine an external demand associated with the one or more individual topics, the external demand associated with the one or more individual topics indicating an external demand for the online content items related to the one or more individual topics outside of the system distribution platform, the external demand associated with the one or more individual topics being determined based on one of (i) an external search information received by the one or more processors from one or more external search platforms external to the system distribution platform and (ii) a social interest information associated with the one or more individual topics from an external search platform, wherein a first external demand of the external demand associated with the first topic is determined based on one of (i) a first search information from the external search platform and (ii) a first social interest information of the social interest information associated with the first topic from the external search platform;
determine a disparity between the internal demand and the external demand, for the one or more individual topics, such that a first disparity of the disparities is determined between the first internal demand and the first external demand;
determine quantities of the online content items associated with the one or more individual topics that are available on the system distribution platform;
determine a coverage disparity by comparing the quantities of the online content items associated with the one or more individual topics that are determined available on the system distribution platform to one of the internal demand, the external demand, and the internal demand and the external demand for the one or more individual topics;

determine whether the coverage disparity is above a threshold indicating that the quantities of the online content items associated with the one or more individual topics that are determined available on the system distribution platform are one of underrepresented and underperforming;

generate, for display on a graphical user interface associated with the system distribution platform, a graphical representation of the coverage disparity determined, wherein to generate the graphical representation of the disparities, the one or more processors generate a conditional formatting in a heat map that associates a shade of a first color for a quotient of a disparity between the internal demand and the external demand lower than a pre-selected threshold and a shade of a second color for a quotient of a disparity between the internal demand and the external demand higher than a pre-selected threshold for the one or more individual topics;

identify, via the graphical representation displayed on the graphical user interface and based on the heat map, improvements associated with the one or more individual topics that are available on the system distribution platform; and update, based on determining that the coverage disparity is above the threshold indicating that the quantities of the online content items associated with the one or more individual topics that are determined available on the system distribution platform are underperforming and based on the improvements identified, the quantities of the one or more individual topics of the online content items that are stored on the system distribution platform and underperforming for improving the topic coverage.

2. The system of claim 1, wherein the internal search information indicates a quantity of, results for, and/or interactions with the results for internal search queries entered via the system distribution platform that include keywords corresponding to the one or more individual topics, and wherein the first internal search information indicates the quantity of, results for, and/or interactions with the results for the internal search queries entered via the system distribution platform that include keywords corresponding to the first topic.

3. The system of claim 1, wherein the internal revenue information indicates revenue generated from one or more of the online content items associated with the one or more individual topics, and wherein the first internal revenue information indicates revenue generated from one or more of the first online content items associated with the first topic.

4. The system of claim 1, wherein the internal search information includes a quantity of, results for, and/or interactions with results for external search queries entered via the external search platform that include keywords corresponding to the individual topics and one or more learning intention keywords.

5. The system of claim 1, wherein the external search platform includes one or more of a search engine, a social media platform, and/or a content distribution platform different from the system distribution platform.

6. The system of claim 1, wherein to determine the coverage disparity, the one or more processors determine a quotient representing a ratio of: the internal demand to the external demand, the external demand to the internal demand, and/or a portion of the internal demand to another portion of the internal demand.

7. The system of claim 6, wherein the quotient representing the ratio includes one or both of a ratio and/or quotient representing a ratio of the first internal revenue information for a given period of time to a quantity of searches and/or users searching keywords corresponding to the first topic via the external search platform, and a quotient representing the ratio of the first internal revenue information for a given period of time to a quantity of internal searches and/or internal users searching keywords corresponding to the first topic via the system distribution platform.

8. The system of claim 1, wherein the one or more processors are further configured by machine-readable instructions to determine the quantities of the online content items available via the system distribution platform associated with the one or more individual topics, such that a first quantity of online content items available via the system distribution platform associated with the first topic is determined.

9. The system of claim 8, wherein the one or more processors are further configured by machine-readable instructions to determine the coverage disparity between the first quantity of online content items available via the system distribution platform and the internal demand or external demand for the one or more individual topics, such that a first coverage disparity is determined between the first quantity of online content times and the first internal demand or the first external demand.

10. The system of claim 9, wherein to generate a graphical representation of the coverage disparity includes to generate a representation of the coverage disparity such that individual topics having disparities at or above a given threshold are displayed differently than the individual topics having disparities below the given threshold.

11. The system of claim 1, wherein the one or more processors select the pre-selected threshold to be equal to one.

12. The system of claim 1, wherein one of the individual topics within the set of topics is associated with one or more semantic tags associated with the online content items available via the system distribution platform, such that the first topic within the set of topics is associated with a first semantic tag and the first semantic tag is associated with the first online content items, and wherein associating individual online content items with the one or more individual topics is based on the first semantic tag associated with the individual online content items, such that the first online content items are associated with the first topic based on the first semantic tag.

13. A method for identifying topic coverage for a distribution platform that provides access to multiple online content items, the method being implemented by a computer system including one or more processors configured by machine-readable instructions, the method comprising:

obtaining a set of topics that characterize subject matter of the online content items available via a system distribution platform, the set of topics including individual topics, the individual topics including a first topic;

associating each of the online content items with one or more individual topics, wherein first online content items of the online content items are associated with the first topic;

determining an internal demand associated with the one or more individual topics, the internal demand associated with the one or more individual topics indicating internal demand for the online content items related to the one or more individual topics within the system distribution platform, the internal demand associated with the one or more individual topics being determined based on one of (i) an internal search information received by the one or more processors and (ii) an internal revenue information, wherein a first internal demand of the internal demand associated with the first topic is determined based on one of a first internal search information and a first internal revenue information of the internal revenue information;

determining an external demand associated with the one or more individual topics, the external demand associated with the one or more individual topics indicating an external demand for the online content items related to the one or more individual topics outside of the system distribution platform, the external demand associated with the one or more individual topics being determined based on one of (i) an external search information received by the one or more processors from an one or more external search platform and (ii) a social interest information associated with the one or more individual topics from the external search platform, wherein a first external demand of the external demand associated with the first topic is determined based on one of (i) a first search information from the external search platform and (ii) a first social interest information of the social interest information associated with the first topic from the external search platform;

determining a disparity between the internal demand and the external demand for the one or more individual topics, such that a first disparity of the disparities is determined between the first internal demand and the first external demand;

determining quantities of the online content items associated with the one or more individual topics that are available on the system distribution platform;

determining a coverage disparity by comparing the quantities of the online content items associated with the one or more individual topics that are determined available on the system distribution platform to one of the internal demand, the external demand, and the internal demand and the external demand for the one or more individual topics;

determining whether the coverage disparity is above a threshold indicating that the quantities of the online content items associated with the one or more individual topics that are determined available on the system distribution platform are one of underrepresented and underperforming;

generating, with the one or more processors, for display on a graphical user interface associated with the system distribution platform, a graphical representation of the coverage disparity, and generating a conditional formatting in a heat map that associates a shade of a first color for a quotient of the disparity between the internal demand and the external demand lower than a preselected threshold and a shade of a second color for a quotient of the disparity between the internal demand and the external demand higher than a pre-selected threshold for the one or more individual topics;

identifying, via the graphical representation displayed on the graphical user interface and based on the heat map, improvements associated with the one or more individual topics that are available on the system distribution platform; and updating, based on determining that the coverage disparity is above the threshold indicating that the quantities of the online content items associated with the one or more individual topics that are determined available on the system distribution platform are underperforming and based on the improvements identified, the quantities of the one or more individual topics of the online content items that are stored on the system distribution platform and underperforming for improving the topic coverage.

14. The method of claim 13, wherein the internal search information indicates a quantity of, results for, and/or interactions with the results for internal search queries entered via the system distribution platform that include keywords corresponding the individual topics, and wherein the first internal search information indicates the quantity of, results for, and/or interactions with the results for the internal search queries entered via the system distribution platform that include keywords corresponding the first topic.

15. The method of claim 13, wherein the internal revenue information indicates revenue generated from one or more of the online content items associated with the one or more individual topics, and wherein the first internal revenue information indicates revenue generated from one or more of the first online content items associated with the first topic.

16. The method of claim 13, wherein the internal search information includes a quantity of, results for, or interactions with results for external search queries entered via the external search platform that include keywords corresponding to the individual topics or one or more learning intention keywords.

17. The method of claim 13, wherein the external search platform includes one or more of a search engine, a social media platform, and/or a content distribution platform different from the system distribution platform.

18. The method of claim 13, wherein to determine the coverage disparity the one or more processors determine a quotient representing a ratio of: the internal demand to the external demand, the external demand to the internal demand, a portion of the internal demand to a portion of the external demand, a portion of the external demand to a portion of the internal demand, and/or a portion of the internal demand to another portion of the internal demand.

19. The method of claim 18, wherein the quotient representing the ratio includes one or both of a quotient representing a ratio of the first internal revenue information for a given period of time to a quantity of searches and/or users searching keywords corresponding to the first topic via the external search platform, and a quotient representing the ratio of the first internal revenue information for a given period of time to a quantity of internal searches or internal users searching keywords corresponding to the first topic via the system distribution platform.

20. The method of claim 13, further comprising determining the quantities of the online content items available via the system distribution platform associated with the one or more individual topics, such that a first quantity of online content items available via the system distribution platform associated with the first topic is determined.

21. The method of claim 20, further comprising determining the coverage disparity between the first quantity of online content items available via the system distribution platform and the internal demand or the external demand for the one or more individual topics, such that a first coverage disparity is determined between the first quantity of online content items and the first internal demand or the first external demand.

22. The method of claim 13, further comprising selecting the pre-selected threshold to be equal to one.

23. The method of claim 22, further comprising generating the graphical representation of the coverage disparity such that topics having disparities at or above a given threshold are displayed differently than the individual topics having disparities below the given threshold.

24. The method of claim 13, wherein one of the individual topics within the set of topics is associated with a semantic tag and the semantic tag is associated with the online content items available via the system distribution platform, such that the first topic within the set of topics is associated with a first semantic tag and the first semantic tag is associated with the first online content items, and wherein associating individual online content items with the one or more individual topics is based on the semantic tag associated with the individual online content items, such that the first online content items are associated with the first topic based on the first semantic tag.

* * * * *